(No Model.)

W. C. TRUSSELL.
CAR STARTER.

No. 306,121. Patented Oct. 7, 1884.

Witnesses.

Inventor.
W. C. Trussell
by J. N. Adams
Attorney.

N. PETERS. Photo-Lithographer. Washington, D. C.

UNITED STATES PATENT OFFICE.

WILBURT C. TRUSSELL, OF BOSTON, MASSACHUSETTS, ASSIGNOR TO THE TRUSSELL CAR STARTER COMPANY, OF AUGUSTA, MAINE.

CAR-STARTER.

SPECIFICATION forming part of Letters Patent No. 306,121, dated October 7, 1884.

Application filed May 12, 1884. (No model.)

*To all whom it may concern:*

Be it known that I, WILBURT C. TRUSSELL, a citizen of the United States, residing at Boston, in the county of Suffolk and State of Massachusetts, have invented a new and useful Improvement in Car-Starters, of which the following is a specification.

My invention relates to an improvement in car-starters, with especial reference to a car-starter for which I have made application for a patent under date of January 26, 1884, and which application has been allowed. In the said application no provision was made for holding the lever out of connection with the ratchet-wheel at the rear axle—that is, the axle on which the starting apparatus is not in use—and while the car is moving forward.

The present invention consists in a means for locking the lever in a position so as to hold it out of contact with the ratchet-wheel when the lever and the frame in which it is pivoted have broken joint.

Figure 1:
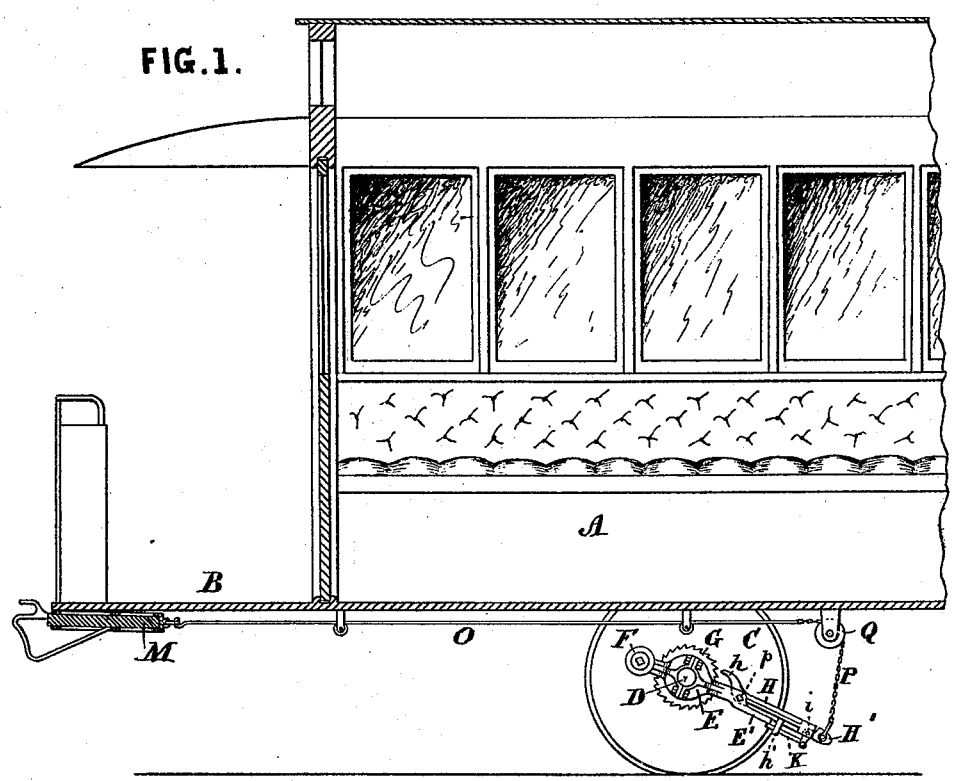
Figure 2:
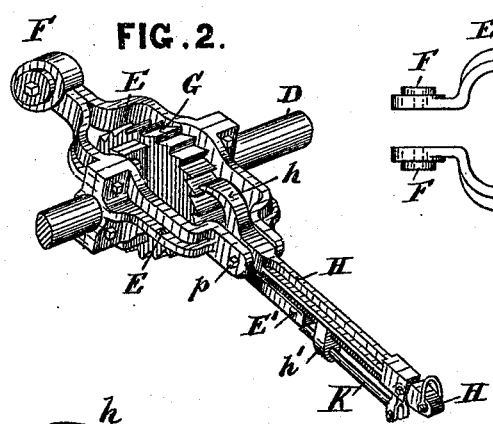
Figure 3:
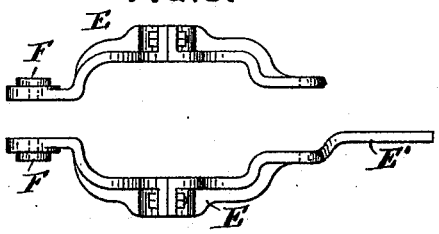
Figure 4:
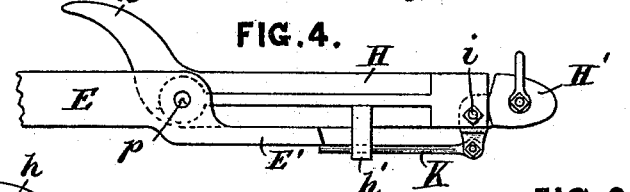
Figure 5:
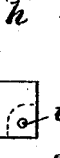
Figure 6:
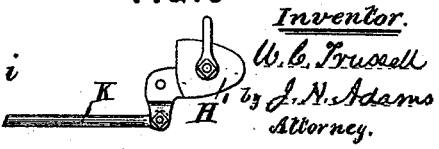

Referring to the accompanying drawings, Figure 1 represents a portion of a railroad-car with my improvement attached. Fig. 2 is an enlarged view in detail of the swinging frame, the ratchet-wheel, and lever. Fig. 3 shows the construction of the swinging frame. Figs. 4, 5, and 6 are enlarged views in detail of the lever and stop or bolt.

A represents a portion of a car-body. B is the platform. C is one of the wheels, and D the axle to which the wheels are secured. It is to be understood that the same arrangement of devices for starting the car is to be applied to both axles.

To the axle D is firmly secured the ratchet-wheel G. E is a frame, which is hung loosely on the shaft or axle D, so as to admit of a free swinging movement on the same, and is weighted at one end, as shown at F.

To the inner end of the swinging frame E is pivoted, at $p$, a lever, H, one end of which is curved, as shown at $h$, so as to engage with the teeth of the ratchet-wheel G, and so that when the outer end of the lever is raised by the draft through the chain Q and rod O the end $h$ will turn the ratchet and with it the axle and wheels, and when the draft is released the weighted end of the frame E will fall and so break joint with lever H. One side of the frame E is elongated and, curving inward, extends to the rear, as shown at E', on a line with the center line of frame E and underneath the lever H.

To the outer end of lever H is pivoted, at $i$, a weighted bell-crank lever, H', to the lower arm of which is pivoted a bar or bolt, K, which passes through a bearing or guide, $h'$, on the under side of lever H, and extends to a point just under the end of the extension E' of the frame E, as shown, when the lever H is depressed and the end $h$ is out of connection with the ratchet-wheel G.

To the outer weighted arm of the bell-crank lever H' is attached a chain, P, connected with rod O, so that when the draft is applied the outer end of the bell-crank lever H' will be raised and the bolt or stop K be drawn out from under the end of the extension E', thus allowing the end $h$ of lever H to engage with the ratchet-wheel G. The stop arrangement is to be used in connection with the rear axle and wheels—that is, to those to which the draft is not applied when the car is in motion—the arrangement of parts being then as shown in Fig. 1. The bolt or stop will hold the lever H so that the end $h$ will not come in contact with the ratchet-wheel G, however much the car may be jolted.

What I claim as my invention is—

1. In a car-starter, the sliding bolt or stop K, in combination with the lever H and frame E E', substantially as and for the purpose specified.

2. The combination of the sliding bolt or stop K, the bell-crank lever H', lever H, ratchet-wheel G, and swinging frame E E', substantially as set forth.

3. The combination, with the swinging frame E, lever H, and ratchet-wheel G, of means for automatically locking the lever so as to hold the end $h$ out of contact with the ratchet-wheel G, substantially as and for the purpose set forth.

In testimony whereof I have signed my name to this specification in the presence of two subscribing witnesses.

WILBURT C. TRUSSELL.

Witnesses:
 JOS. H. ADAMS,
 E. PLANTA.